Oct. 9, 1956 J. E. GERRY ET AL 2,765,778
HYDRAULIC ACTUATED STEERING MECHANISM
Filed Sept. 17, 1954 2 Sheets-Sheet 1
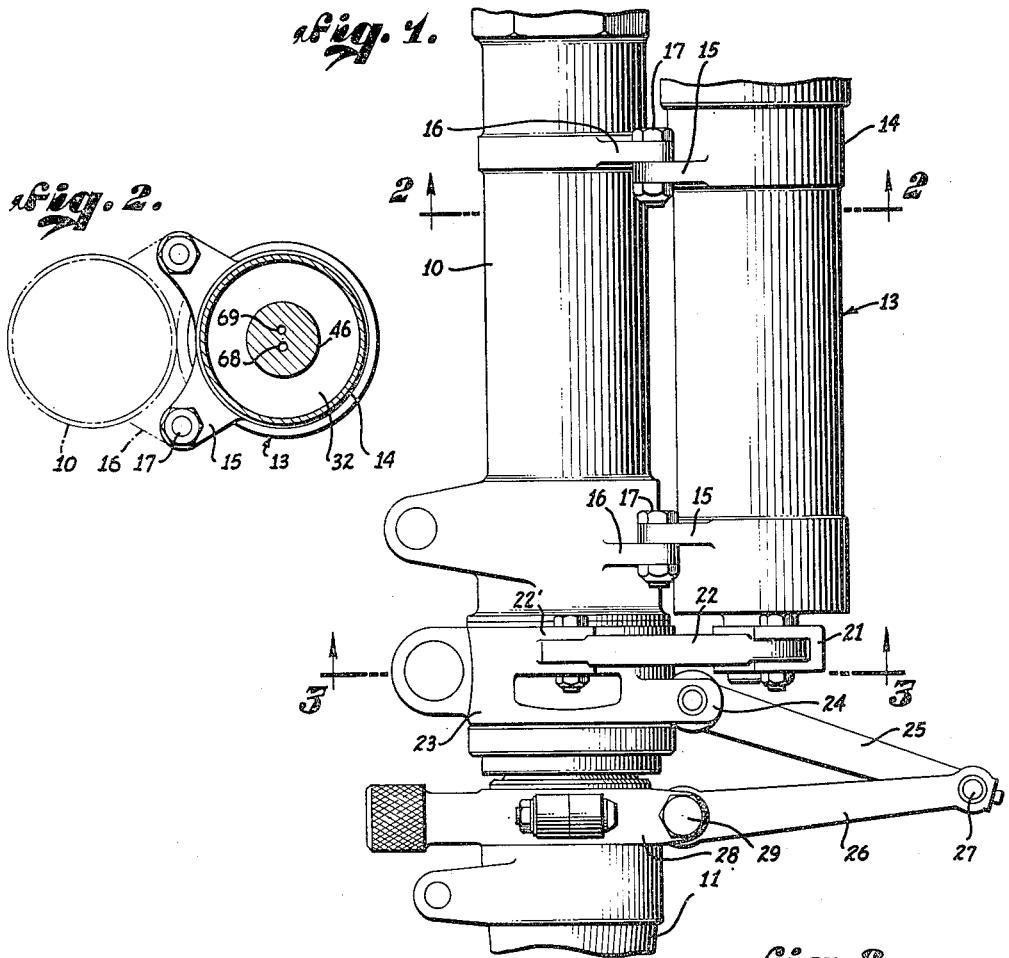
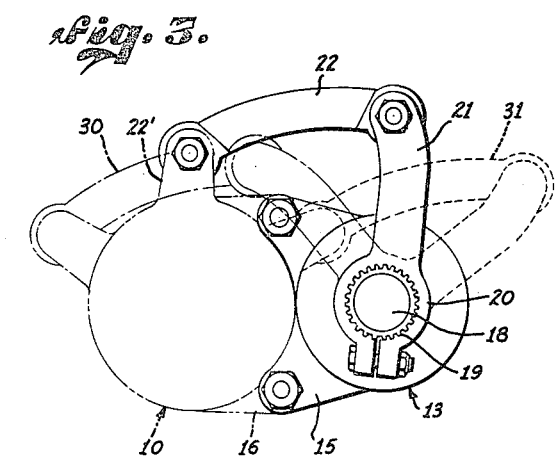
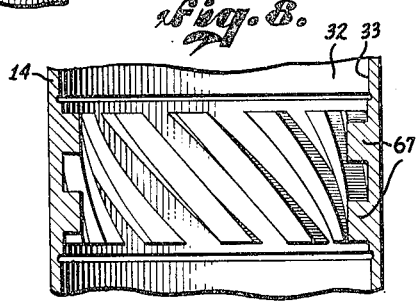
JULIAN E. GERRY &
LEWIS J. MALTBY,
INVENTORS.
HUEBNER, BEEHLER,
WORREL & HERZIG,
ATTORNEYS.

Oct. 9, 1956 J. E. GERRY ET AL 2,765,778
HYDRAULIC ACTUATED STEERING MECHANISM
Filed Sept. 17, 1954 2 Sheets-Sheet 2

JULIAN E. GERRY &
LEWIS J. MALTBY,
INVENTORS.

HUEBNER, BEEHLER,
WORREL & HERZIG,
ATTORNEYS.

United States Patent Office 2,765,778
Patented Oct. 9, 1956

2,765,778

HYDRAULIC ACTUATED STEERING MECHANISM

Julian E. Gerry, Van Nuys, and Lewis J. Maltby, Burbank, Calif.

Application September 17, 1954, Serial No. 456,796

5 Claims. (Cl. 121—38)

The invention relates to hydraulic motors and in particular a hydraulic motor adapted for use as a steering device for airplanes. The invention is particularly useful in steering the third wheel of a tricycle carriage of an airplane, the mechanism being such that power for the hydraulic mechanism can be released during landing and take-off operations so that the wheel will be free to caster depending upon the direction of motion of the airplane on the ground. The steering apparatus is chiefly for directing the travel of the airplane during taxying.

Hydraulic mechanisms are one of the most commonly employed mechanisms for controlling various devices on airplanes. While hydraulic motors have distinct advantages for such use, they do, however, have certain disadvantages, one of these being the necessity of making the hydraulic parts relatively heavy in order to contain the hydraulic pressures employed with a minimum of distortion and internal leakage and also to be able to withstand the shocks expected of the mechanism in landing and take-off from the runway.

Other limitations in devices of this kind as well as in comparable mechanical devices is the necessity for regular inspection and servicing. In devices heretofore employed insufficient attention has been given to the provision of structures easy to inspect and easy to service and overhaul. Operations of servicing, inspection and overhaul should be capable of being quickly performed between trips and to this end mechanisms more accessible to the mechanic charged with inspection and more easily disconnected for removal and replacement are desirable.

It is therefore among the objects of the invention to provide a new and improved hydraulic mechanism capable of translating linear motion to rotary motion by employment of a substantially minimum number of relatively moving parts.

Another object of the invention is to provide a new and improved hydraulic actuated steering mechanism which may be effectively sealed internally with standard circular packings which will accommodate some distortion of mating parts and thereby allow the use of a lightweight housing free of internal leakage.

Still another object of the invention is to provide a new and improved hydraulic steering mechanism which is sealed with respect to substantially all of the moving parts and wherein lubrication is assured by reason of the fact that the relatively moving parts have a lubricating liquid always present and forced into contact with the frictionally engaging surfaces.

Still another object of the invention is to provide a new and improved hydraulic motor for translating lineal motion into rotary motion by use of a combination of spiral threads and straight splines wherein the threads are continuous and separate from the splines which in turn are also continuous.

Still another object of the invention is to provide a new and improved hydraulic steering mechanism wherein moving parts are substantially contained within the mechanism and wherein a sufficient turning radius is provided without resort being necessary to an axial or lineal movement of more than a relatively small amount.

With these and other objects in view, the invention consists in the construction, arrangement and combination of the various parts of the device whereby the objects contemplated are attained, as hereinafter set forth, pointed out in the appended claims and illustrated in the accompanying drawings.

This application is a continuation-in-part of co-pending application Serial No. 278,292, filed March 24, 1952, now Patent No. 2,747,549, issued May 29, 1956.

In the drawings:

Figure 1 is a side elevational view of the device showing the device in a position mounted on the column of a landing wheel of an airplane.

Figure 2 is a cross-sectional view taken on the line 2—2 of Figure 1.

Figure 3 is a cross-sectional view taken on the line 3—3 of Figure 1.

Figure 8 is a fragmentary longitudinal sectional view of the mid-portion of the device.

Figure 4:
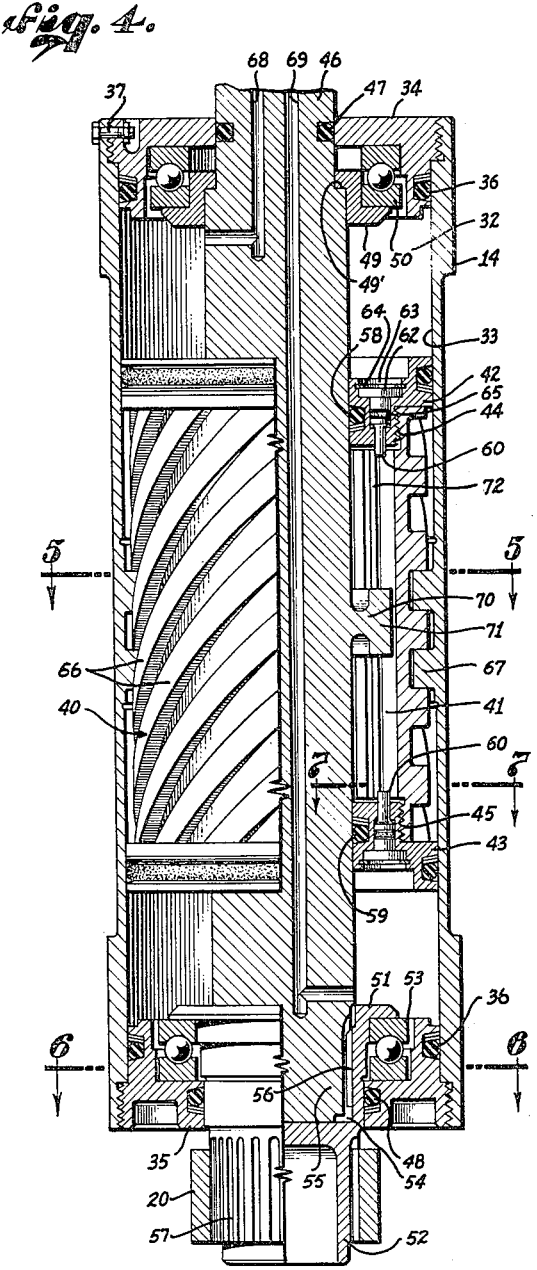
Figure 4 is a longitudinal sectional view of the device showing a piston on the interior half in section.

In an embodiment of the device chosen for the purpose of illustration there is shown a column 10 adapted to extend below the undercarriage of an airplane. At a lower end of the column is a wheel mount 11 at the upper end of which is a vertical shaft by means of which the wheel mount is adapted to rotate with respect to the column. The wheel mount is what may be described as a caster wheel mount adapted to have secured thereon a suitable conventional wheel (not shown).

Inasmuch as the wheel mount is adapted to rotate with respect to the column 10, means need be provided for rotating the wheel mount. These means are incorporated in a hydraulic motor indicated generally by the reference character 13. The motor and particularly a housing 14 thereof is shown provided with brackets 15 attachable to similar brackets 16 on the column 10 by means of bolts 17.

By action of the hydraulic motor a piston rod 18 is rotated. The piston rod has a fluted portion 19 to which a collar 20 is attached. The collar 20 includes a steering arm 21 connected by means of a link 22 to a sleeve 23 rotatably secured upon the column 10. A bracket 24 on the sleeve 23 has attached thereto a lever 25 in turn pivotally connected to another lever 26 by means of a pivot pin 27. The lever 26 is in turn attached to a clamp 28 by means of a bolt 29. The clamp in turn is non-rotatably attached to the wheel mount 11 so that when the piston rod 18 is rotated, so also is the wheel mount 11. Rotation in one direction is shown by the broken line 30 of Figure 3 whereas rotation in a contrary direction is shown by a dotted line 31 of Figure 3. Intermediate position is illustrated by the solid line. In the same Figure 3 are illustrated ears 22' by means of which the link 22 is secured to the sleeve 23.

The hydraulic motor previously indicated by the reference character 13 consists of the housing 14 which contains virtually all parts of the mechanism. The housing has a cylindrical interior chamber 32 having interior cylindrical walls 33. End walls 34 and 35 close and seal the chamber. For more effective sealing an O-ring 36 is provided at each end. For added safety the end wall in each case is secured by a safety bolt 37 to keep the end wall from becoming unscrewed. Within the housing 14 is a hollow piston 40. The piston is designed to be located intermediate the end walls 34 and 35. The hollow piston has at the interior a chamber 41 closed by ends 42 and 43. The ends of the piston are joined to the piston by threads 44 and 45. A piston rod 46 extends through both of the end walls 34 and 35 of the housing and both of the ends 42 and 43 of the hollow piston. The piston rod is mounted rotatably with respect to the end walls 34 and 35 while at the same time is prevented from axial movement with respect thereto. Sealing rings 47 and 48 respectively in the end walls 34 and 35 prevent hydraulic fluid within the chamber 32 from escaping. To provide for endwise thrust of the piston rod a step-bearing collar 49 is mounted on the piston rod 46 adjacent a shoulder 49' with the step-bearing collar 49 positioned to thrust endwise against a ball bearing 50. At the other end a step-bearing collar 51 which extends outwardly to become a fitting 52 bears endwise or axially against a ball bearing 53. The fitting contains a pocket 54 in which a reduced portion 55 of the piston rod is adapted to rest. A spline 56 having portions respectively in the reduced portion of the piston rod and the fitting holds the piston rod non-rotatable with respect to the fitting 52. The fitting is provided with splines 57 on the exterior adapted to mesh with splines of the collar 20 so that the collar is non-rotatably mounted upon the fitting and in consequence non-rotatable relative to the piston rod.

It will be noted further that to assure the chamber 41 being liquid-tight a seal 58 is mounted in the end 42 adjacent the wall of the piston rod and a seal 59 is mounted in the end 43 in similar fashion against the piston rod 46.

As previously noted the ends 42 and 43 threadedly engage the hollow piston. To anchor the ends against unthreading there is provided a safety structure which is identical at each end and features one or more lock pins 60 so positioned that they may lie between adjacent continuous longitudinal splines 72 which are evenly spaced around the circumference of the interior wall of the hollow piston 40. Each lock pin includes a head 62 lying in an appropriate aperture 63 and there locked in place by a lock ring 64 which can be snapped into an appropriate recess. By this device the safety of the lock pin is made safe by the feature embodied in the lock ring. Seals 65 may be employed to assure the tightness of the lock pin so that the lubricating fluid will not escape.

On the exterior of the hollow piston is a series of square threads 66 cut on a relatively steep spiral. These threads mesh with similar square threads 67 on the interior wall 33 of the cylindrical chamber 32. As indicated in Figure 8 the square threads 67 are located approximately midway between opposite ends of the chamber and extend only a relatively short proportion of the length of the chamber. It will be noted that because of the intermeshing of sets of square threads respectively on the exterior of the hollow piston and the interior of the housing, movement endwise of the hollow piston will result in a rotation of the piston about its central axis.

Figure 5:
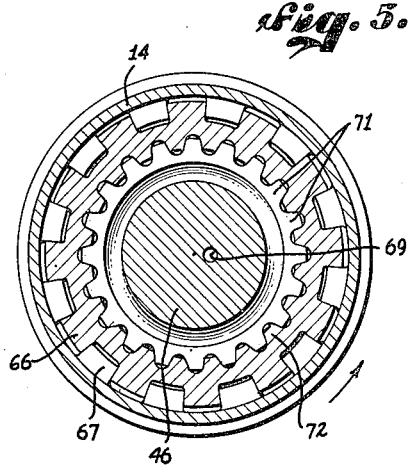
Figure 5 is a cross-sectional view on the line 5—5 of Figure 4.
Figure 6:
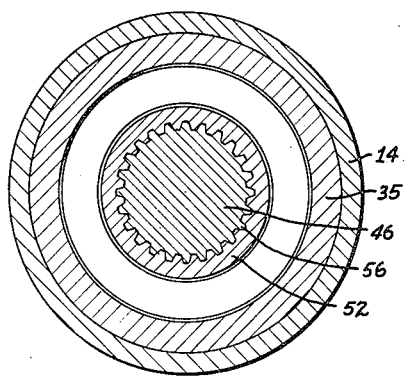
Figure 6 is a cross-sectional view on the line 6—6 of Figure 4.
Figure 7:
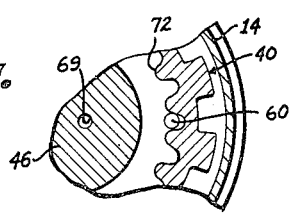
Figure 7 is a fragmentary cross-sectional view on the line 7—7 of Figure 4.

To move the piston in one direction or another there is provided in the piston rod a hydraulic fluid passage 68 opening into the upper end of the chamber 32 and a hydraulic fluid passage 69 opening into the lower end of the chamber. When hydraulic fluid is sent through the passage 68 and exhausted through the passage 69, hydraulic pressure on the end 42 of the hollow piston will move it downwardly. This will cause a rotation of the piston clockwise as viewed in Figure 5. Contrarily introduction of hydraulic fluid through the passage 69 and exhaust of the same through the passage 68 will move the hollow piston upwardly, as viewed in Figure 4, which will effect a counter-clockwise rotary motion of the piston, as viewed in Figure 5.

Affixed to the piston rod substantially midway of the chamber 32 is an annular flange 70. At the circumference of the annular flange is a series of vertically extending splines 71. These splines are spaced and dimensioned so as to mesh slidably with continuous longitudinal or vertically extending splines 72 spaced circumferentially about the interior wall of the hollow piston 40. The hollow piston is designed to contain a lubricating liquid to lubricate the sliding movement of the splines 71 relative to the splines 72. As the piston moves axially lubricant from one end of the chamber 41 is forced over the splined surfaces to the other end. By this action there is a forced lubrication. The intermeshing square threads are likewise forcibly lubricated by a lubricating liquid sealed in the annular chamber 32 formed as shown by the inside wall of the housing 14 and the outside wall of the hollow piston 40.

When hydraulic pressure is applied to the chamber 32 causing the hollow piston to move in one direction or another, this, as previously indicated, causes the piston to rotate. Rotation of the piston will cause the piston rod 46 to rotate because of the intermeshing of the splines 71 and 72. The piston rod, however, will remain in position, not moving axially during its rotation. The piston, moreover, will slide longitudinally along the piston rod as well as along the interior wall of the housing. Rotation of the piston rod caused by the action just described will rotate the fitting 52, in turn causing movement of the steering linkage identified in part by the links 22 and result consequently in a rotation of the wheel mount 11 either toward the right or toward the left, clockwise or counter-clockwise, as viewed in Figure 3, depending upon whether the hollow piston is being moved up or down.

From the foregoing description it will be appreciated that virtually all moving parts of the hydraulic motor are contained within the housing. Only the piston rod which rotates is exposed. All remaining structure lies within the chamber 32 between the end walls 34 and 35. Lubrication is assured by reason of forced lubricating fluid. The portion of the piston rod 46 which extends through end wall 34 can be used to operate a follow-up valve mechanism.

Further still in the embodiment of the invention herein described the hydraulic pressure is applied to an area of the hollow piston which is as great as it can be within the confines of the chamber 32. For this reason a minimum amount of hydraulic pressure need be employed for achieving the necessary motion.

The resultant effect of the structure herein described is to provide a direct-acting motion translator capable of being attached to the exterior of the column which supports the wheel mount and which moreover is sufficiently simple in its operation and having relatively few parts that a rugged and dependable hydraulic steering mechanism is provided.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. A hydraulic reciprocatable mechanism comprising a substantially cylindrical housing having a cylindrical chamber therein presenting an interior cylindrical wall, end walls at opposite ends of the housing sealing the ends of the housing, a piston rod extending into the chamber, said piston rod being rotatably mounted in said end walls and secured against axial movement, a hollow piston in said chamber intermediate opposite ends and having an exterior cylindrical wall adjacent to and in close sliding relationship to the interior cylindrical wall of the chamber, heads at opposite ends of said hollow piston enclosing a chamber and said last chamber having an interior cylindrical wall, said heads having a snug sliding fit around the piston rod and said piston rod being extended into said chamber in the piston, an annular flange on said piston rod and within the chamber of the piston including an adjacent outside cylindrical wall having a snug sliding engagement throughout the circumference with the interior cylindrical wall of said last chamber, spirally rotating engaging means extending throughout the circumference of each wall of one pair of adjacent outside and inside cylindrical walls with the means on one wall of said pair terminating at opposite ends thereof at the respective ends of said one wall, and non-rotatable and longitudinally movable engaging means extending throughout the circumference of the other pair of adjacent outside and inside cylindrical walls, and supply and return hydraulic passages communicating with the outer of said chambers and adapted to act against the heads of the piston.

2. A hydraulic reciprocatable rotating mechanism comprising a substantially cylindrical housing having a cylindrical chamber comprising an imperforate wall structure and presenting an interior cylindrical wall, end walls at opposite ends of the housing sealing the ends of the housing, a piston rod extending into the chamber, said piston rod being rotatably mounted and secured against axial movement, a hollow piston in said chamber intermediate opposite ends and having an adjacent exterior cylindrical wall in close sliding relationship to the interior cylindrical wall of the chamber, heads at opposite ends of said hollow piston enclosing a chamber and said last chamber having an interior cylindrical wall, said heads having a snug sliding fit around the piston rod and said piston rod being extended into said chamber in the piston, an annular flange on said piston rod and within the chamber of the piston including an outside cylindrical wall adjacent to and having a snug sliding engagement throughout the circumference with the interior cylindrical wall of said last chamber, a set of diagonal splines on one wall of one pair of adjacent outside and inside cylindrical walls extending in one general direction from end to end of said one wall, and a second set of splines on the other wall of said one pair of adjacent outside and inside cylindrical walls meshing with said first set of splines throughout the circumference, and supply and return hydraulic passages communicating with one of said chambers and adapted to act against the heads of the piston, and sets of meshing non-rotatable and longitudinally movable splines between the other pair of adjacent outside and inside cylindrical walls, said sets of splines acting together and being adapted to translate endwise movement of the piston in one of two opposite directions under force of hydraulic pressure into limited rotary movement in the piston rod in a respective rotary direction.

3. A hydraulic rotatably reciprocating mechanism comprising a substantially cylindrical housing having a cylindrical chamber of relatively thin substantially uniform wall structure presenting an interior cylindrical wall, end walls at opposite ends of the housing sealing the ends of the housing, a piston rod extending through the end walls and the chamber, said piston rod being rotatably mounted in said ends and secured against axial movement, a hollow piston in said chamber intermediate opposite end walls of relatively thin substantially uniform wall structure and having an exterior cylindrical wall adjacent to and in close sliding relationship to the interior cylindrical wall of the chamber, heads at opposite ends of said hollow piston enclosing a chamber and said last chamber having an interior cylindrical wall, said heads having a snug sliding fit around the piston rod and said piston rod being extended through said chamber in the piston, an annular flange on said piston rod and within the chamber of the piston including an outside cylindrical wall adjacent to and having a snug sliding engagement throughout the circumference thereof with the interior cylindrical wall of said last chamber, a set of spiral splines extending throughout the circumference of one wall of one pair of adjacent outside and inside cylindrical walls and a set of spiral splines extending throughout the circumference of the other wall of said one pair of adjacent outside and inside cylindrical walls meshing throughout the circumference with said first set of splines, and a pair of sets of frictionally engaging longitudinal splines on the respective walls of the other pair of adjacent outside and inside cylindrical walls, both said last identified sets of splines extending throughout the circumference, supply and return hydraulic passages in said piston rod communicating respectively with opposite ends of the outer of said chambers and adapted to act against the heads of the piston and a lubricating liquid in the other of said chambers, said sets of splines acting together being adapted to translate axial movement of the piston under force of hydraulic pressure into rotational movement in the piston rod.

4. A hydraulic rotatable reciprocating mechanism comprising a substantially cylindrical housing having a cylindrical chamber therein presenting an interior cylindrical wall, end walls at opposite ends of the housing sealing the chamber, a piston rod rotatably mounted in the housing and extending into the chamber, said piston rod being secured against axial movement, a hollow piston with heads forming a closed piston chamber and located within said first chamber, an exterior wall on said piston in sliding relationship with said interior cylindrical wall, a pair of sets of frictionally engaging continuous relatively steep meshing square threads respectively on said exterior and interior cylindrical walls adapted to cause rotation of the piston when the piston is moved axially, the threads of the set of threads on said exterior wall having opposite ends terminating at respective opposite ends of said piston and angularly spaced at an interval of less than 360 degrees whereby to limit the amount of rotational movement of the piston rod, and hydraulic fluid passages into one of said chambers at respectively opposite ends for introducing hydraulic fluid thereto, an interior cylindrical wall on the hollow piston having at least one longitudinal continuous straight spline, an annular flange on the piston located intermediate the heads and extending to a sliding fit with the interior cylindrical wall of the piston and having at least one continuous straight longitudinal spline frictionally engaging said first identified straight spline and adapted to effect rotation of the piston rod upon rotation of the piston.

5. A hydraulic rotatable reciprocating mechanism comprising a substantially cylindrical housing having a cylindrical chamber therein presenting an interior cylindrical wall, end walls at opposite ends of the housing sealing the chamber, a piston rod rotatably mounted in said end walls and extending through the chamber, said piston rod being secured against axial movement, and means at one end of the piston rod exterior to the housing for attachment of a steering link, a hollow piston with heads forming a closed piston chamber and located within said first chamber, an exterior wall on said piston in snug sliding relationship with said interior cylindrical wall, a plurality of frictionally engaging and continuous relatively steep meshing square threads substantially covering respectively said exterior and interior cylindrical walls, the threads on one of said walls having ends terminating at opposite ends of the wall and separated by an angular distance of less than 360 degrees, said threads being adapted to cause a limited rotation of the piston when the piston is moved axially, and hydraulic fluid passages into said cylindrical chamber at opposite ends of the cylindrical chamber for introducing hydraulic fluid to said cylindrical chamber, an interior cylindrical wall on the hollow piston having circumferentially spaced longitudinal continuous straight splines substantially covering said last identified wall, an annular flange on the piston located intermediate the heads and extending to a frictionally engaging snug sliding fit with the interior cylindrical wall of the piston and having continuous longitudinal straight splines extending throughout the length and circumference of the flange and meshing with said first identified straight splines, said meshing straight splines being adapted to effect rotation of the piston rod upon rotation of the piston, said piston chamber being adapted to contain a lubricating liquid sealed therein for lubricating said straight splines, said square threads having a clearance therearound adapted to contain a lubricating liquid and said liquid being confined by exterior portions of the heads of said hollow piston.

References Cited in the file of this patent

UNITED STATES PATENTS

| | | |
|---|---|---|
| 226,591 | Barrie | Apr. 20, 1880 |
| 416,147 | Edgerton | Nov. 26, 1889 |
| 1,005,763 | Adams | Oct. 10, 1911 |
| 1,741,871 | Mitchell | Dec. 31, 1929 |
| 2,204,649 | Barnhart | June 18, 1940 |
| 2,524,850 | Stevenson et al. | Oct. 10, 1950 |

FOREIGN PATENTS

| | | |
|---|---|---|
| 23,980 | Great Britain | Nov. 3, 1903 |